United States Patent [19]

Colon

[11] 3,910,473

[45] Oct. 7, 1975

[54] APPLIANCE FOR PUNCHING RECORD CARDS

[75] Inventor: George M. Colon, Los Angeles, Calif.

[73] Assignee: Data Entry Systems, El Segundo, Calif.

[22] Filed: June 12, 1974

[21] Appl. No.: 478,445

[52] U.S. Cl. .................................... 225/93; 346/104

[51] Int. Cl.[2] ....................... G06K 21/06; B26F 1/02

[58] Field of Search ....... 225/93, 97; 35/48 R, 48 B; 53/390; 206/449; 269/15, 16, 293; 346/104

[56] References Cited

UNITED STATES PATENTS

| | | | |
|---|---|---|---|
| 3,201,038 | 8/1965 | Harris | 346/104 X |
| 3,598,164 | 8/1971 | August | 269/15 |
| 3,633,803 | 1/1972 | Kourganoff | 35/48 BX |
| 3,691,727 | 9/1972 | Doerscheln | 53/390 |

*Primary Examiner*—J. M. Meister
*Assistant Examiner*—Fred A. Silverberg

[57] ABSTRACT

The appliance of the present invention is used for manually punching or marking record cards. It is comprised of a housing having a first storage area for unpunched cards, a second storage area for punched cards, a surface for punching (or marking) record cards and two passageways. The first passageway leads from the first storage area to the punching surface and the second passageway leads from the punching surface to the second storage area. A roller is disposed in the passageways to supply an additional force for moving the record cards, one at a time, into position on the punching surface. It also serves as a means for guiding the record cards, after they are punched, into the second storage area. The punching surface is comprised of a backing apparatus which has rectangular frustrum shaped apertures for enabling all punched areas (chads) to be cleanly separated from the record card. A hood, capable of being positioned in either an open or closed position is mounted on the housing. In the open position of the hood, record cards may be placed in the first storage area. In the closed position, the operational position, access to the record cards is not possible.

14 Claims, 10 Drawing Figures

APPLIANCE FOR PUNCHING RECORD CARDS

BACKGROUND OF THE INVENTION

1. Field of the Invention

This invention relates to the field of data recording and, more specifically, to an appliance which enables the manual recording of data on record cards, the storage of punched and unpunched cards, and the mechanical positioning of the cards without bending or mutiliation.

2. Prior Art

The manual recording of data on record cards is an established procedure in numerous data gathering applications, both in the office and in the field. The record cards typically contain identifying indicia associated with prescored areas to aid in data collection. Data is recorded by placing a record card on a punching surface and punching out appropriate pre-scored areas from the card.

A number of appliances are disclosed in the prior art for recording data on record cards in the manner just described. However, each of these prior art appliances suffers from one or more significant shortcomings. One such shortcoming of some prior art appliances is that they employ a backing apparatus which does not adequately remove all of the punched areas (referred to as "chads"). For example, U.S. Pat. No. 3,341,097 discloses an appliance having a solid backing apparatus comprised of a material which deflects under pressure and which becomes mechanically attached to the chads. However, because record cards often become statically charged, the chads may nevertheless attach themselves to the record cards and not to the backing apparatus. Moreover, the backing apparatus of this prior art appliance can neither ensure a clean punch will be made nor that the mechanical attachment provided will be strong enough to remove a partially attached chad from a record card.

The appliance of U.S. Pat. No. 2,923,452 utilizes electrically sensed cards making it necessary to insure that the chads are cleanly removed from the record card. This device employes a template with a plurality of circular frustrum shaped apertures through which a punch can be driven. However, when a punch is driven through the circular frustrums, if the chad does not become detached, no means other than the frustrum are provided to remove the chad from the card. Moreover, neither this device nor the device mentioned above provides storage areas or mechanical means for placing the record cards onto the punching surface.

The present invention overcomes these shortcomings and limitations of the prior art by providing an appliance having many improved structural features. One important feature is the backing apparatus incorporated in the appliance beneath the punching surface. The backing apparatus disclosed substantially enhances the mechanical removal of all chads from the record cards, thereby providing punched cards which will not jam or otherwise foul mechanical card readers. Moreover, the invented appliance is self-cleaning in that all chads fall into a removable tray; thus, they do not build up under the punching surface.

Another significant feature of the present invention is the inclusion of a roller having a corrugated surface which contacts the record cards as they pass along the path from their storage area to the punching surface. The roller provides an additional force which enables the high speed transfer of the cards smoothly from their storage area onto the punching surface.

The present invention also has the advantage of providing three separate and convenient storage areas for record cards. A first storage area contains unpunched record cards in a position ready for punching. A second storage area contains the cards after they have been punched. A third storage area provides additional storage of cards, typically unpunched cards prior to their being loaded into the first storage area. Easy access is provided to each of the storage areas. Another advantageous feature of this invention is that after cards are loaded into the first storage area, the order of the cards cannot be disturbed until the cards are removed from the appliance.

While some data recording appliances of the prior art may disclose some similar features, there has heretofore been no appliance for punching record cards which combines in one structure all of the features and advantages of the present invention described hereinabove.

SUMMARY OF THE INVENTION

The present invention is comprised of (i) a hooded housing which contains three record card storage areas, the first for storing unpunched cards ready for use, i.e., the second for storing punched cards, and the third for general storage of cards; (ii) a backing apparatus, including a planar surface, for individually punching (or marking) record cards; and (iii) two passageways within the housing, one leading from the first storage area to the punching surface, the other leading from the punching surface to the second storage area. Record cards are moved from the first storage area to the punching surface through the first passageway by a frictional force existing between the cards and the user's fingers. In the passageway, the cards are forced between the housing and a tubular roller with a corrugated surface mounted therein. The roller is caused to rotate by the thrust of the cards and the induced momentum of the roller adds an additional force to the cards to drive them rapidly through the first passageway and onto the punching surface. After a card is punched, it is moved from the punching surface through the second passageway to the second storage area by the friction force existing between the user's fingers and the card. The lower portion of the roller guides the card into the second storage area.

The punching (or marking) surface is comprised of an upper member, a plurality of polyurethane strips and supporting member. The upper member has disposed therethrough a plurality of rectangular frustrum shaped apertures. The polyurethane strips are disposed beneath the upper member such that a gap is created between the strips immediately below each row of apertures in the upper member. The supporting member is disposed beneath the polyurethane strips, securing the strips in position and supporting the upper member. A record card is punched with a punching tool adapted to punch out a chad in any pre-scored area. The chad is pushed down through the corresponding rectangular frustrum shaped aperture and forced into the gap between the flexible polyurethane strips. The gap is generally narrower than the width of the chad. As the tool is withdrawn, the gap closes and grasps the chad to prevent it from remaining attached to the card. If any chads remain after the punching tool is withdrawn, sharp edges provided on the rectangular frustrum shaped apertures will remove them as the card is moved off the punching surface.

Thus, it is a principle object of this invention to provide an improved appliance for manually recording data on punchable record cards, an appliance which moves the cards through without bending or mutiliation and cleanly removes all chads therefrom.

It is another principal object of this invention to provide an appliance for punching record cards having at least two easily accessible storage areas, one for storing unpunched cards and the second for storing punched cards.

It is another object of this invention to provide an appliance for punching record cards which maintains the punched cards in the same relative order they had before being punched.

It is still another object of this invention to provide an appliance for punching record cards in which the cards may easily be moved by manual manipulation from the first storage area to the punching surface and from the punching surface to the second storage area.

The novel features which are characteristic of the present invention, as well as other objects and advantages thereof, will be better understood from the following description, reference being had to the accompanying drawings in which a presently preferred embodiment of the invention is illustrated by example.

DETAILED DESCRIPTION OF THE PREFERRED EMBODIMENT

Figures 1, 2, 3:
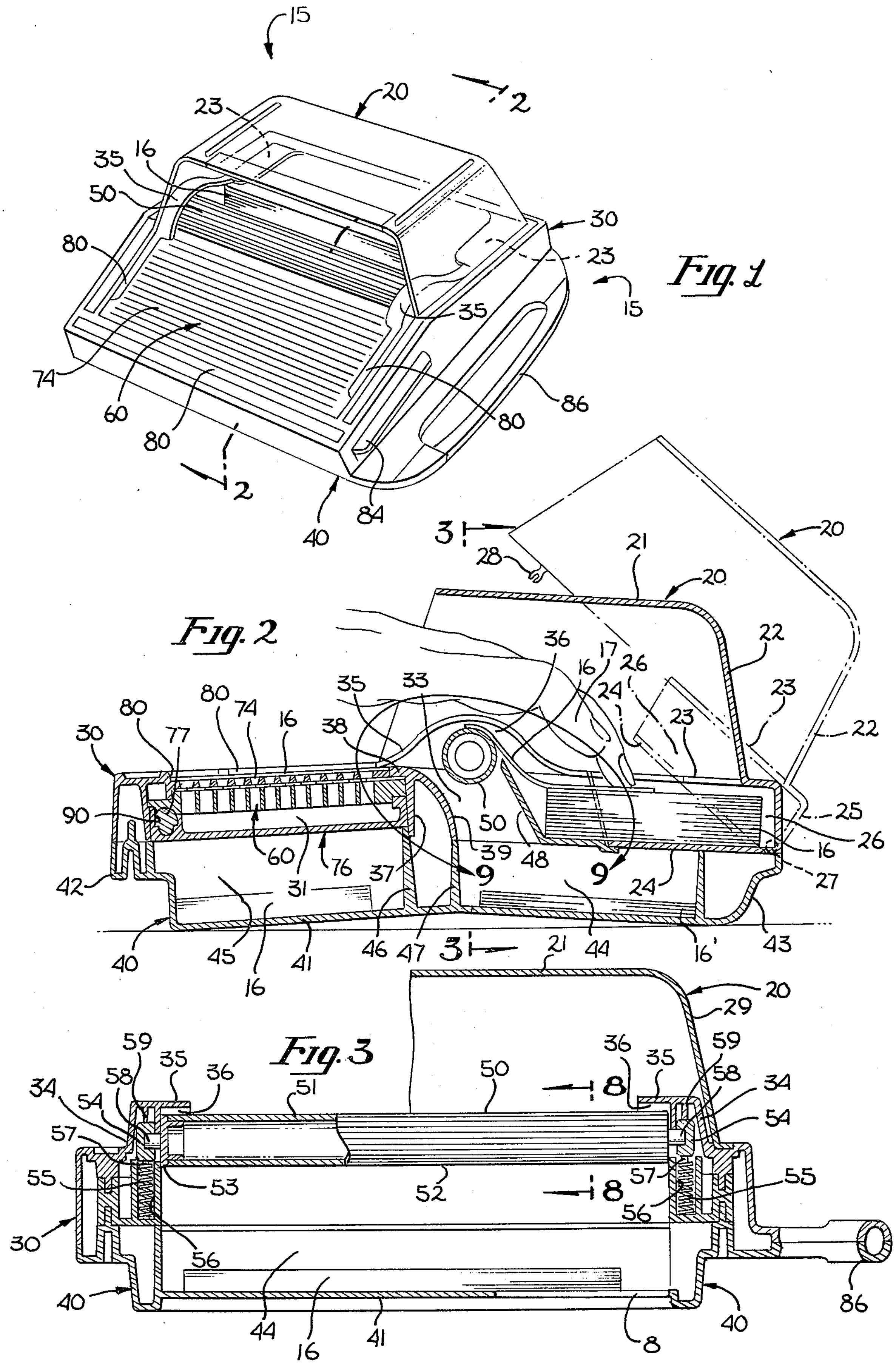
FIG. 1 is a pictorial view of the invention.
FIG. 2 is a section view taken along line 2—2 of FIG. 1 illustrating the card storage area, passageways and punching surface.
FIG. 3 is a sectional view taken along line 3—3 of FIG. 2 and illustrates the spring loaded roller.
Figure 4:
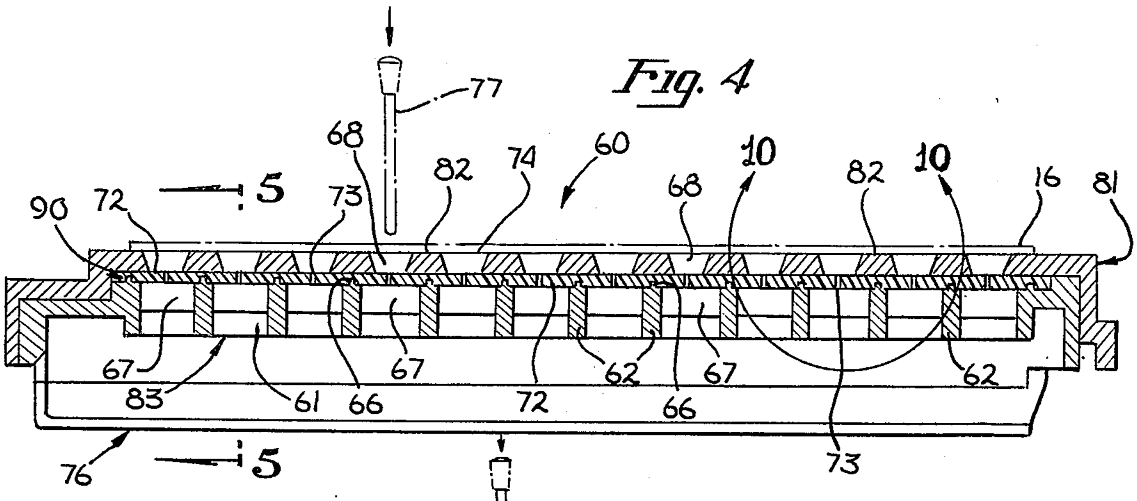
FIG. 4 is a sectional view taken along line 4—4 of FIG. 6 illustrating the punching surface and other layers comprising the backing apparatus of the invention.
Figure 5:
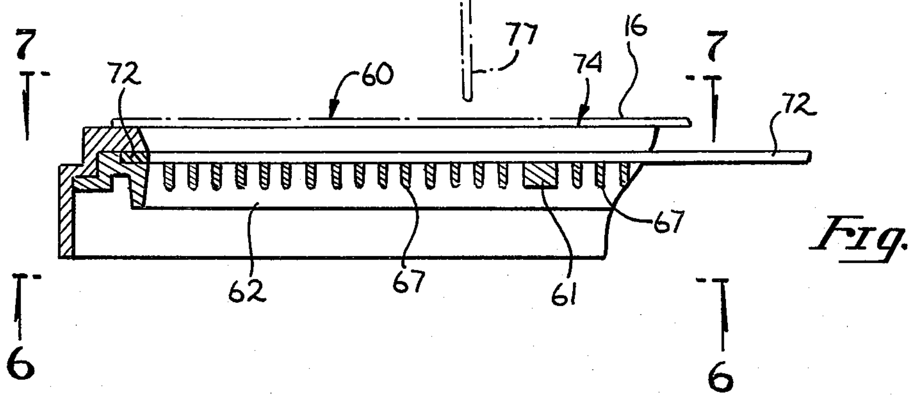
FIG. 5 is a section view taken along line 5—5 of FIG. 4 further illustrating the backing apparatus.

The present invention is an appliance 15 for punching holes in pre-scored record cards and is best illustrated pictorially in FIG. 1. The appliance 15 is manually operated and capable of being transported by hand to where data is to be collected. The appliance is comprised of the following basic components: a cover and containing hood 20 containing a first card storage area 26; an upper housing 30 containing first and second passageways; a lower housing 40 containing a second and third card storage areas 44 and 45 respectively; a roller 50; and a backing apparatus 60 with a surface 74 for punching or marking cards 16. These basic components are best illustrated in the cross sectional view shown in FIG. 2. The hood 20 is mounted on the rear of the upper housing 30 on an axis 27 such that the hood 20 may rotate upward and expose the first and second storage areas 26 and 44 respectively. The first storage area 26, used to contain unpunched record cards 16 which are ready for use, is disposed within the hood 20 in the rear of the upper housing 30. The second storage area 44, located in the rear of the lower housing 40, is used for containing punched record cards 16'. The third storage area 45 is located in the forward portion of lower housing 40. It may be used for general card storage, typically unpunched cards prior to their being loaded into the first storage area 26. The backing apparatus 60 is disposed in the forward part of the upper housing 30 and provides the means for punching and cleanly removing all chads 78 from the record cards 16.

The covering and containing hood 20 is generally boxed shaped, comprising a top 21, sides 29, back 22, and an interior ledge 23. The front of the hood 20 is open and allows a hand to be inserted into the hood 20 such that the user's fingers 17 may be positioned on the unpunched cards 16. Disposed towards the rear and bottom of the hood 20 is the small box-like storage area which comprises the first storage area 26, used to contain unpunched cards 16. A portion of the top of the first storage area 26 is covered by the ledge 23. The ledge 23 restricts movement of the cards 16 so that they cannot be ejected from the first storage area 26 into the hood 20, while, at the same time, permitting the user's fingers 17 to make contact with the top of the cards 16. A botton 24, back 25, and side 29 serve to form the remainder of the box-shaped, first storage area 26. The front of the first storage area 26, however, is left opened so as to allow cards 16 to be placed into or removed therefrom. The hood 20, being hinged on the axis 27 near the lower rear portion of the first storage area 26, is capable of being raised to the position shown by phantom lines in FIG. 2. In this position, record cards 16 may be easily placed within the first storage area 26. The maximum rotation of the hood 20 is such that it cannot reach a point where the cards 16 may be spilled. On the other hand, it rotates sufficiently to enable the easy insertion and removal of cards 16 from first storage area 26. A clip 28 is secured to each side 29 of the hood 20. Clips 28 are engageable with corresponding apertatures in the upper housing 30 and, thereby, secure the hood 20 to the housing 30 when it is down or closed (during operation of the appliance 15).

The upper housing 30, defining front, and middle compartments 31 and 33 respectively, is comprised of sides 34, front and back sections and top members 35, one on each side of the appliance 15, extending from the rear of the punching surface 74 to the front of the first storage area 26. The front compartment 31 is adapted to receive the backing apparatus 60. The backing apparatus 60, described more fully hereinbelow, is formed as a single unit and is adapted to being snapped into and out of position within the upper housing 30 for repair or replacement. Disposed along the periphery of the upper surface of said backing apparatus 60 are guides 80 aligning each record card 16 properly on the punching surface 74. Two of the guides 80 are disposed on the transverse sides of the backing apparatus 60, and the third guide 80 is disposed on the longitudinal side thereof opposite the side from which record cards 16 enter the backing apparatus 60. Also disposed in the front section 31 of upper housing 30, immediately below the backing apparatus 60, is a tray 76 which may be inserted or withdrawn from the appliance 15. The tray 76 serves to catch and contain all chads 78 which are punched from the record cards 16. The chads 78 may be removed from the appliance 15 by removing the tray 76 and emptying it. A handle 84 facilitates removal of the tray 76 from the appliance 15, as seen in FIG. 1. A slot 90 for containing a punching tool 77 is located in the tray 76.

Figures 8, 9, 10:
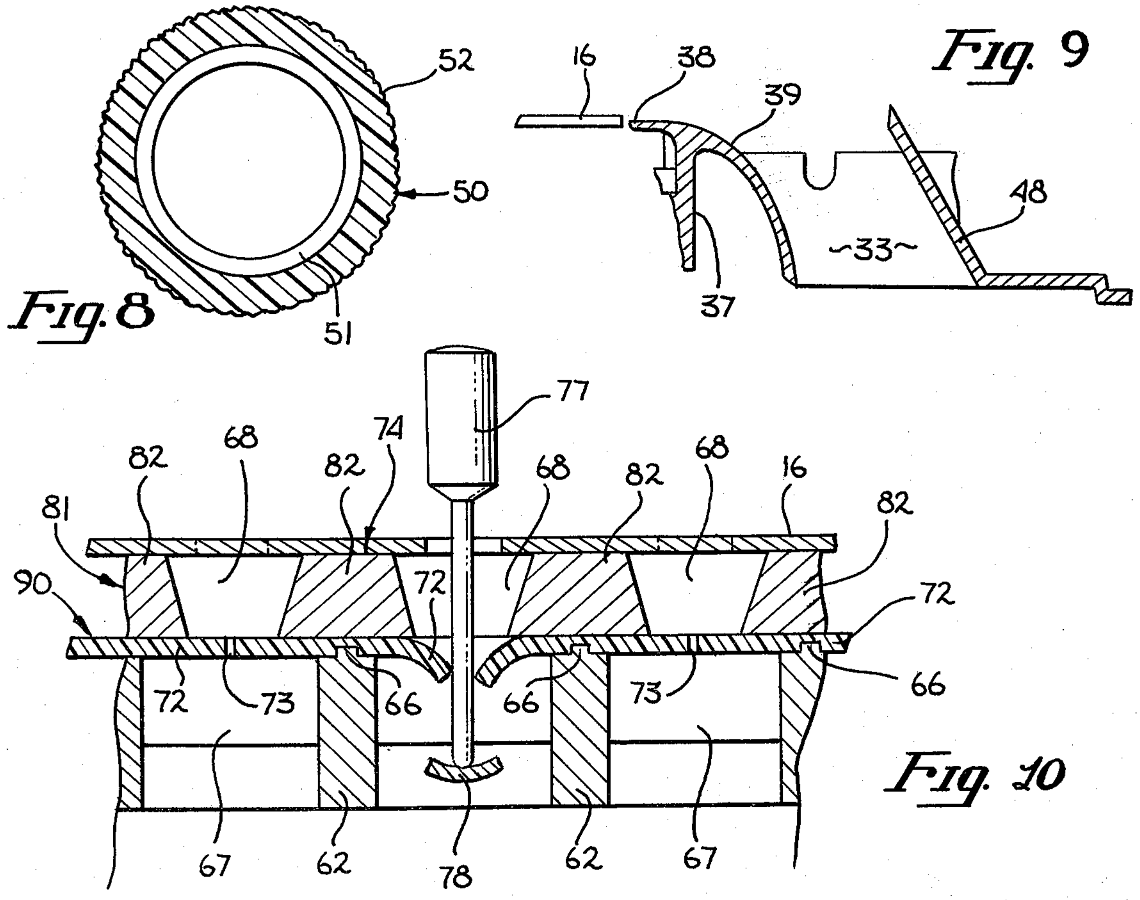
FIG. 8 is a blown-up sectional view taken along line 8—8 of FIG. 3 illustrating the cross section of the roller.
FIG. 9 is a blown-up sectional view of the structure defining the passageways of FIG. 2.
FIG. 10 is a blown-up sectional view taken along line 10—10 of FIG. 4, illustrating the punching surface and a record card being punched such that the chad is falling through the backing apparatus.

The middle compartment 33 of the upper housing 30 contains the structure which defines the two passageways. Reference should be made to FIGS. 2, 3, and 9. It is seen that the roller 50 is disposed across the width of the middle compartment 33 such that its upper surface is always above the punching surface 74 and first storage area 26. The roller 50 is mounted on bearing 54 and is capable of rotating about its longitudinal axis. The roller 50 is comprised of a tubular member 51 and a cap 53 with a tip 58 which is engageable with bearings 54. The bearings are generally rectangular in shape and are slideably contained within a slot 56 in the upper housing 30. The bearings have a projection 57 which is engageable with spring 55 which is mounted in the slot 56 so as to urge the bearings upward until contacting stop 59. In this upper position, the roller 50 is positioned adjacent to the bottom surfaces of the top members 35 of the upper housing 30. However, a small gap 36, approximately equal to the thickness of a record card 16, remains between the roller surface 52 and the bottom surfaces of the top members 35. The surface 52 of the roller 50 is corrugated, as shown in FIG. 8, so as to create friction between the card 16 and the roller 50. Also disposed within the middle compartment of upper housing 30 is an inclined wall 48. Thus, the first passageway, by means of which cards 16 pass from the first storage area 26 to the punching surface 74, is defined by the top surface of the inclined wall 48, the top surface of roller 50, and the bottom surfaces of top members 35. When a card 16 is inserted within the first passageway, the corrugated surface 52 engages the card 16, causing the roller 50 to rotate. The momentum of the roller 50 adds an additional force for smoothly and rapidly driving the card 16 through the first passageway and onto the punching surface 74.

After being punched, the cards 16' are passed through the second passageway into the second storage area 44. The second passageway, located within the middle compartment 33 of the upper housing 30, is defined by the bottom of roller 50, the bottom surface of the inclined wall 48 and a member 37 having a tip 38 and a curved surface 39. The tip 38 is designed such that as a punched card 16' is pushed from the punching surface 74, the tip 38 guides it to engagement with the bottom surface of the roller 50. As the card 16' engages the roller 50, the roller 50 rotates counter clockwise (as seen from the right) smoothly forcing the card 16' into a downward path along the bottom surface of the inclined wall 48 and into the second storage area 44. The curved surface 39 serves to allow a frictional force to be developed between the roller 50 and the card 16' in order to drive the card through.

The lower housing 40 is generally rectangular in shape and is divided into front and rear compartments 45 and 44 respectively. The lower housing 40 is formed by a bottom member 41, a front member 42, a back member 43 and central supporting members 46 and 47, the latter dividing the lower housing 40 into two compartments, as best seen in FIG. 2. Supporting members 46 and 47 also support the member 37 of the upper housing 30. The rear compartment 44 of the lower housing 40 constitutes the second storage area 44 which receives punched cards 16' from the punching surface 74 via the second passageway. The second storage area 44 is accessible through opening 8 in the bottom member 41 of housing 40. Similarly, access to the third storage area 45 is through an opening in bottom member 41 (not shown).

The backing apparatus 60, comprised of three separate layers, is now described with reference to FIGS. 4–7 and 9. The uppermost layer is a template 81 which provides the punching surface 74. The template 81 has a plurality of apertures 68 disposed therethrough, which correspond in alignment with the pre-scored areas in the record cards 16, as seen best in FIG. 7. The shapes of these apertures 68 is a rectangular frustrum, each having its larger end disposed toward the punching surface 74. The template 81 with the rectangular frustrum apertures 68 is formed from an extruded or molded plastic sheet having cross members 82. However, template 81 may be made from any other suitable material.

Figure 6:
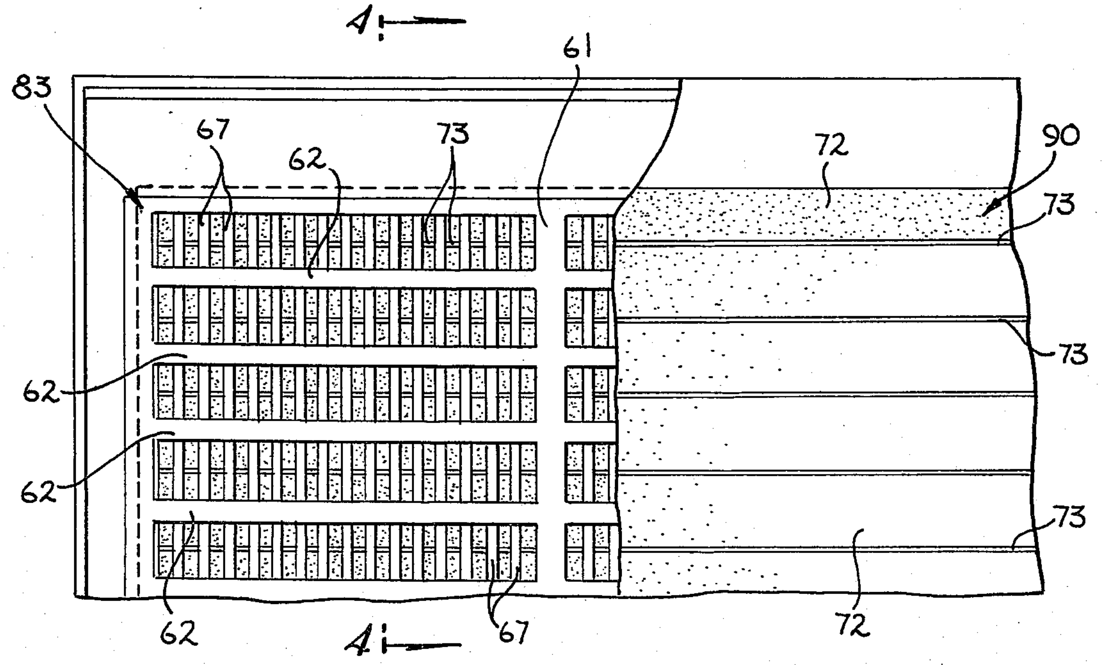
FIG. 6 is a bottom view of a portion of the backing apparatus.
Figure 7:
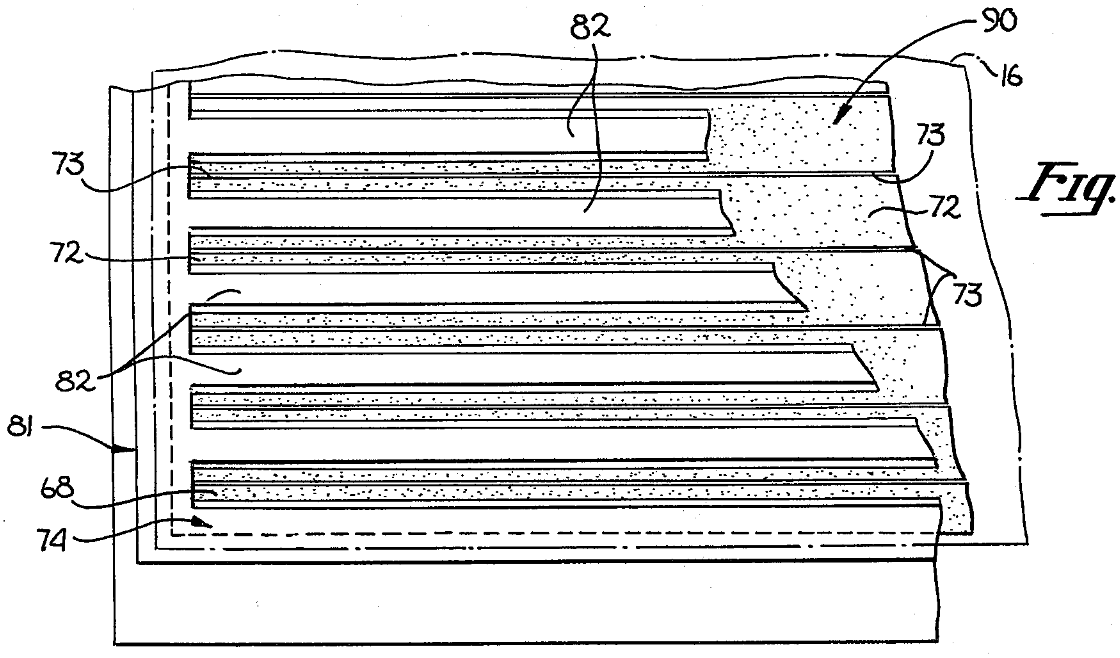
FIG. 7 is a blown-up top view of the punching surface.

The second layer of the apparatus 60, disposed beneath the template 81, is a resilient layer 90 most clearly shown in FIGS. 6 and 7. The resilient layer 90 in the presently preferred embodiment is formed from strips 72 of polyurethane material (foam rubber) which are easily flexed. The strips 72 are disposed across the width of the punching surface 74. The width of each strip 72 is approximately equal to the distance between center lines of the apertures 68 in the template 81. In place, the strips 72 form a resilient layer 90 since each strip 72 is positioned in a closely opposed position to the adjacent strip 72. However, a small gap 73 is formed between each pair of strips 72 comprising the layer 90. Each gap 73 is positioned so as to be centered beneath each row of apertures 68. Thus, the punching tool 77, when passed through an aperture 68, will also pass through the gap 73. As the punching tool 77 pushes through the strips 72, they flex and permit the punching tool 77 to force a chad 78 through the gap 73 and into the tray 76, as shown in FIG. 10. When the tool 77 is withdrawn, the gap 73 once again closes, thereby ensuring that the chad 78 is permanently separated from the card 16.

The resilient strips 72 are secured in position beneath template 81 by the third layer of backing apparatus 60, a lower supporting frame 83. Supporting frame 83 is comprised of a plurality of supporting members 61, cross members 62 and rib members 67. The supporting members 61 extend across the width of the punching surface 74 as shown in FIG. 6. Extending upward perpendicularly from the main supporting members 61 and supported thereby is a plurality of cross members 62. These cross members 62 are spaced apart a distance equal to the center to center distance between the cross members 82 of the template 81, and are disposed beneath each longitudinal row of cross members 82. Also disposed beneath the cross members 82 in the transverse direction is a plurality of rib members 67. The lower supporting frame 83 is disposed immediately beneath the resilient layer 90 and provides support for the urethane strips 72.

Each cross member 62 has on its upper end a small protrusion 66, best seen in FIG. 10, which is used to compress the urethane strips 73 and secure them in position between the supporting frame 83 and template 81. The backing apparatus 60 is formed as a single unit, capable of being snapped into place in the upper housing 30 or removed therefrom for repair or replacement.

The upper and lower housings 30 and 40 are secured together by screws or other fastening means well known in the art. Both the upper and lower housings 30 and 40 may be formed from an extruded or molded plastic or other suitable material which is light-weight and has adequate structural integrity. The hood 20 likewise, may be made of an extruded or molded plastic. In the presently preferred embodiment, the hood 20 is formed from a transparent plastic to enable the user of the appliance to observe the supply of cards 16 in the first storage area 26, and also to enable visual observation when record cards 16 are being manually moved from the first storage area 26 to the punching surface 74. A handle 86, seen in FIGS. 1 and 3, is formed an an integral part of the upper and lower housings, facilitating the manual transportation of the appliance 15 to the data collection place.

In operation, the hood 20 is initially opened to the position shown by phantom lines in FIG. 2. In this position, a supply of ordered or unordered cards 16 may be placed in the first storage area 26. After the cards 16 have been placed in the first storage area 26, the hood 20 is closed and the clip 28 is snapped into an aperture in the upper housing to secure the hood 20 thereto. The appliance 15 is now ready to be transported to wherever the data is to be obtained.

In order to punch information into a first record card 16, the user's hand is placed through the open front of the hood 20 until his fingers 17 engage the upper surface of the top card 16. The card 16 is then slid forward by the friction force existing between the fingers 17 and the card 16 until it engages the inclined wall 48. The inclined wall 48 and top member 35 guide the card 16 into the first passageway, through the space 36 and over the roller 50. The sliding force imparted to card 16 is transmitted to the roller 50, causing the latter to rotate. The momentum thereby imparted to the roller 50 helps to accelerate the card 16 as it is driven forward through the first passageway to the punching surface 74. The guides 80 serve to properly align and position the card 16 with respect to the template 81. In addition to rotating, the roller 50 is also lowered against spring 55, causing the latter to be compressed. The upward force thereby generated by spring 55 increases the frictional contact between the roller 50 and the card 16.

The punching tool 77 is then used to punch the proper holes for recording data as shown in FIG. 10. The point of the punch 77 is disposed through the card at one of the pre-scored areas. The resulting chad 78 is disposed downwardly through the corresponding rectangular frustrum shaped aperture 68 in the template 81, through the gap 73 between the corresponding pair of resilient strips 72, and between the rib members 67 and cross members 62. The resilience of the strips 72 permit the point of the punching instrument 77 to be driven through the gap 73. However, once the point is withdrawn, the sides of the resilient strips 72 return to their original shapes, thereby tearing away or grasping any chad 78 which may have not been completely removed from the card 16. In the event that a portion of the chad 78 is still attached to the card 16 after the tool 77 has been withdrawn, it will be sheared from the card as the card is moved into the second passageway because of the sharp edges provided on the apertures 68 in the template.

After a record card 16′ has been punched, it is manually transported to the second storage area 44 by again positioning the finger tips 17 on the card and gently sliding it backward toward the roller 50. As the card 16′ begins its travel, it passes above the tip 38 on the inner supporting frame 37. Tip 38 directs the leading edge of the card 16′ toward the lower surface of the roller 50. As the card 16′ engages the lower surface of the roller 50, the roller is caused to rotate. In rotating, the roller 50 directs the card 16′ downward toward the second storage area 44. The bottom surface of the inclined wall 48 helps to guide the card 16′ into the lower storage area 44. Punched cards 16′ are stacked in the second storage area 44 in the same relative order as they were stacked in the first storage area 26. The present invention, therefore, allows data to be stored on a series of cards 16, without the cards ever leaving the appliance 15. After removal from the appliance 15, the punched cards 16′ are typically processed through an electro-mechanical card reader.

The present invention herein described is not restricted to merely the preferred embodiment described herein, but is intended to cover other variations and changes understood by those skilled in the art without departing from the scope or spirit of the invention.

I claim:

1. An appliance for recording data on record cards by punching holes in said cards at selected prescored areas thereof, comprising;

a. a housing;

b. a first storage area disposed in said housing for containing record cards prior to their being punched;

c. a second storage area disposed in said housing for containing record cards after they have been punched;

d. backing means for supporting each of said record cards while data is being recorded thereon, said backing means being disposed within said housing and in communication with said first and second storage areas through first and second passageways in said housing repectively, said backing means being comprised of:

i. a template having a plurality of rows of apertures and providing a surface for punching said record cards;

ii. a plurality of resilient strips disposed beneath said template, said strips having between each pair thereof a small gap, said gaps being disposed beneath corresponding rows of said apertures; and iii. a support structure disposed beneath said strips and providing support thereto; and e. a rotatable cylindrical roller disposed within said housing so as to engage said record cards as they pass through said first and second passageways, whereby, said unpunched record cards are manually forced from said first storage area to the surface of said backing means through said first passageway and, after having data punched thereon, said cards are manually forced from said backing means to said second storage area through said second passageway, said backing means removing all chads produced by punching said cards.

2. The appliance of claim 1 wherein the order of said punched record cards in said second storage area is the same relative order of the same cards in said first storage area prior to their being punched.

3. The appliance of claim 1 wherein said housing includes a hood rotatably mounted to the rear of said housing, said first storage area being located in an interior compartment of said hood and said second storage area being located in a rear, lower portion of said housing beneath said first storage area in said hood.

4. The appliance of claim 3 wherein said hood has an open and closed position, said open position thereof enabling the loading of said record cards in said first storage area and said closed position thereof enabling the said manual manipulation of said record cards.

5. The appliance of claim 1 having in addition thereto means for aligning each of said record cards on the upper surface of said backing means.

6. The appliance of claim 5 wherein said means for aligning said record cards is comprised of first, second, and third guides disposed along the periphery of the upper surface of said backing means, said first and second strips being located on the transverse sides thereof, and said third guide being located on the longitudinal side thereof opposite the side from which said record cards enter said backing means.

7. The appliance of claim 1 having in addition there to a slidable tray disengageably disposed within said housing below said backing means, said tray being adapted to catch and retain said chads, whereby said tray is disengaged from said housing to empty said chads therefrom.

8. The appliance of claim 1, wherein the top surface of said roller defines a portion of said first passageway so that said record cards, when engaging said roller, cause said roller to rotate, the momentum of said roller in turn providing additional force for smoothly driving said record cards through said first passageway.

9. The appliance of claim 1, wherein the bottom surface of said roller defines a portion of said second passageway so that said record cards, when engaging said roller cause said roller to rotate, the momentum of said roller in turn providing additional force for smoothly driving said record cards through said second passageway.

10. The appliance of claim 1, wherein said roller is mounted on bearing means which are urged upward by spring means, and the surface of said roller is corrugated to provide greater friction between said surface and said record cards 11. The appliance of claim 1, wherein said template has sharp edges, said plurality of resilient strips are disposed in a planar layer across the width of said template, said gaps are centered beneath said corresponding rows of apertures, and said support structure is comprised of rib members and cross members.

whereby, said punching tool, passing through one of said apertures, also forces said chad through the corresponding gap between said resilient strips by flexing said strips, the removal of said tool allowing said gap to close and thereby causing said chad to be separated from said record card.

12. The appliance of claim 11, wherein said apertures in said template are in the form of rectangular frustrums with the larger openings thereof being disposed toward said punching surface, said apertures having sharp edges.

13. The appliance of claim 11 wherein said resilient strips are formed from polyurethane.

14. An appliance for recording data on record cards by punching holes in said cards at selected pre-scored areas thereof, comprising:

a. a housing having a hood rotatably mounted to the rear thereof, a first storage area being located in an interior compartment of said hood and a second storage area being located in a rear, lower portion of said housing beneath said first storage area in said hood, said first storage area being adapted to contain record cards prior to their being punched and said second storage area being adapted to contain record cards after they have been punched;

b. backing means for supporting each of said record cards while data is being recorded thereon, said backing means being disposed within said housing and in communication with said first and second storage areas through first and second passageways in said housing respectively, said backing means comprising:

i. a template having a plurality of rows of apertures and providing a surface for punching said record cards, said apertures having sharp edges and being in the form of rectangular frustrums with the larger openings thereof being disposed toward said punching surface;

ii. a plurality of resilient, polyurethane strips disposed in a planar layer beneath said template across the width thereof, said strips forming a plurality of small gaps between each pair thereof, said gaps being centered beneath corresponding rows of said apertures; and iii. a support structure comprised of rib members and cross members disposed beneath said strips and providing support thereto;

c. a rotatable cylindrical roller mounted in said housing on bearing means which are urged upward by spring means, said roller being disposed within said housing so as to engage said record cards as they pass through said first and second passageways, the top surface of said roller defining a portion of said first passageway so that said record cards, when engaging said roller, cause said roller to rotate, the momentum of said roller in turn providing additional force for smoothly driving said record cards through said first passageway, the bottom surface of said roller defining a portion of said second passageway so that said record cards, when engaging said roller cause said roller to rotate, the momentum of said roller in turn providing additional force for smoothly driving said record cards through said second passageway, the surface of said roller being corrugated to provide greater friction between said surface and said record cards; and d. means for aligning said record cards comprising first, second, and third guides disposed along the periphery of the upper surface of said backing means, said first and second strips being located on the transverse sides thereof, and said third guide being located on the longitudinal side thereof opposite the side from which said record cards enter said backing means, whereby, said unpunched record cards are manually forced from said first storage area to said backing means through said first passageway and, after having data punched thereon, said cards are manually forced from said backing means to said second storage area through said second passageway, said punched record cards having the same relative order in said second storage area as they did in said first storage area, and substantially all chads produced by punching said cards being separated therefrom by the flexing and recovery of said resilient strips and the sharp edges of said apertures.

* * * * *